US011441935B2

(12) United States Patent
Liu et al.

(10) Patent No.: US 11,441,935 B2
(45) Date of Patent: Sep. 13, 2022

(54) FLOW RATE DETERMINATION BASED ON LIMITED OBSERVATIONS

(71) Applicant: INTERNATIONAL BUSINESS MACHINES CORPORATION, Armonk, NY (US)

(72) Inventors: Frank Liu, Austin, TX (US); Cheng-Wei Yu, Austin, TX (US); Vincent Moriarty, Queensbury, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 263 days.

(21) Appl. No.: 16/426,300

(22) Filed: May 30, 2019

(65) Prior Publication Data
US 2020/0378819 A1 Dec. 3, 2020

(51) Int. Cl.
*G01F 25/10* (2022.01)
*E02B 7/20* (2006.01)
*G01F 1/002* (2022.01)

(52) U.S. Cl.
CPC .............. *G01F 25/10* (2022.01); *E02B 7/205* (2013.01); *G01F 1/002* (2013.01)

(58) Field of Classification Search
None
See application file for complete search history.

(56) References Cited

U.S. PATENT DOCUMENTS

| 7,565,266 | B2 * | 7/2009 | Yam | G05B 23/0221 |
| | | | | 702/181 |
| 10,366,500 | B2 * | 7/2019 | Zamalloa | G06T 7/251 |
| 2003/0197617 | A1 * | 10/2003 | Berger | G08B 21/20 |
| | | | | 340/605 |

(Continued)

FOREIGN PATENT DOCUMENTS

| CN | 106021854 A | 10/2016 |
| CN | 105005707 B | 8/2017 |

(Continued)

OTHER PUBLICATIONS

Provided Machine translation of Ikeda et al. (Year: 2013).*

(Continued)

*Primary Examiner* — Matthew G Marini
(74) *Attorney, Agent, or Firm* — Cantor Colburn LLP; Joseph Petrokaitis

(57) ABSTRACT

Methods, systems and computer program products for determining an accurate flow rate based on limited observations are provided. Aspects include receiving a limited sample of flow rate data associated with a test site of a test river. Aspects also include determining topographical characteristics of the test site. Aspects also include determining a plurality of similar tested sites and generating a test site rating curve based on a combination of the limited sample of flow rate data and sufficient flow rate data associated with one or more of the plurality of similar tested sites. Aspects also include obtaining a stage reading associated with the test site from a sensor disposed at the test site. Aspects also include determining a flow rate of the test site based on the stage reading and the test site rating curve.

20 Claims, 10 Drawing Sheets

(56) References Cited

U.S. PATENT DOCUMENTS

| | | | |
|---|---|---|---|
| 2009/0134623 A1* | 5/2009 | Krouse | F03B 17/066 290/43 |
| 2014/0003672 A1 | 1/2014 | McWethy et al. | |
| 2014/0182727 A1* | 7/2014 | Rasmussen | E02B 3/02 138/39 |
| 2014/0350856 A1* | 11/2014 | Lambie | G01W 1/10 702/3 |
| 2016/0225162 A1 | 8/2016 | Cody et al. | |
| 2018/0003531 A1* | 1/2018 | Rick | G01S 13/60 |

FOREIGN PATENT DOCUMENTS

| | | | | |
|---|---|---|---|---|
| CN | 108460814 A | * | 8/2018 | G06F 30/20 |
| JP | 5303320 B2 | * | 10/2013 | |
| JP | 5778295 B2 | | 2/2017 | |
| WO | 2014178116 A1 | | 6/2014 | |

OTHER PUBLICATIONS

Mayer, "How to Calculate Stream Flow Rate," Sciencing.com; May 23, 2018; URL: https://sciencing.com/calculate-stream-flow-rate-6697587.html. Retrieved May 17, 2019. 5 pages.

* cited by examiner

FLOW RATE DETERMINATION BASED ON LIMITED OBSERVATIONS

BACKGROUND

The present invention generally relates to programmable computing systems, and more specifically, to computing systems, computer-implemented methods, and computer program products configured to determine an accurate flow rate (e.g., of a river stream) based on limited observations.

A flow rate of a river stream is a representation of the volume of liquid per second that is flowing through a given point of a river. River stream flow rates can be a crucial hydrologic variable that can impact flooding and the operation of river-based sites such as dams, floodgates, hydroelectric power facilities and the like. River stream flow rates can vary at different points along the same river due to the topography of the river and can also vary over time due to variable water levels (e.g., due to irregular rainfall patterns). A river stream flow rate for a particular point of a river can be determined by directly measuring the flow of the river at that point, but this is typically difficult and expensive as it requires specially constructed weirs and flow velocity measurement instruments. A rating curve for a particular point in a river can be extrapolated to provide a flow rate for the point in the river as a function of the stage (i.e., water level) of the river based on a plurality of measurements taken at the point in the river at different stages. Such rating curves are site specific and requires many data points spanning across various flow conditions, which can be very time and labor intensive to acquire.

SUMMARY

Embodiments of the present invention are directed to a computer-implemented method for determining an accurate river stream flow rate based on limited observations. A non-limiting example of the computer-implemented method includes receiving a limited sample of flow rate data associated with a test site of a test river by a processor. The limited sample of flow rate data may include a number of data points that is less than a threshold number of data points. The method also includes determining topographical characteristics of the test site by the processor. The method also includes determining a plurality of similar tested sites by the processor. A similar tested site can include a river site having topographical characteristics that are above a threshold level of similarity to the topographical characteristics of the test site and about which sufficient flow rate data has been collected for generating an accurate rating curve. Sufficient flow rate data may include a number of data points that is greater than or equal to the threshold number of data points. The method also includes generating a test site rating curve by the processor based on a combination of the limited sample of flow rate data and the sufficient flow rate data of one or more of the plurality of similar tested sites. The method also includes obtaining a stage reading associated with the test site from a sensor disposed at the test site. The method also includes determining a flow rate of the test site by the processor based on the stage reading and the test site rating curve.

Embodiments of the present invention are directed to a system for determining an accurate river stream flow rate based on limited observations. The system includes a memory having computer readable computer instructions, and a processor for executing the computer readable instructions. The computer readable instructions include instructions for receiving a limited sample of flow rate data associated with a test site of a test river. The limited sample of flow rate data may include a number of data points that is less than a threshold number of data points. The computer readable instructions also include instructions for determining topographical characteristics of the test site. The computer readable instructions also include instructions for determining a plurality of similar tested sites. A similar tested site can include a river site having topographical characteristics that are above a threshold level of similarity to the topographical characteristics of the test site and about which sufficient flow rate data has been collected for generating an accurate rating curve. Sufficient flow rate data may include a number of data points that is greater than or equal to the threshold number of data points. The computer readable instructions also include instructions for generating a test site rating curve based on a combination of the limited sample of flow rate data and the sufficient flow rate data of one or more of the plurality of similar tested sites. The computer readable instructions also include instructions for obtaining a stage reading associated with the test site from a sensor disposed at the test site. The computer readable instructions also include instructions for determining a flow rate of the test site based on the stage reading and the test site rating curve.

Embodiments of the invention are directed to a computer program product for determining an accurate river stream flow rate based on limited observations, the computer program product comprising a computer readable storage medium having program instructions embodied therewith. The program instructions are executable by a processor to cause the processor to perform a method. A non-limiting example of the method includes receiving a limited sample of flow rate data associated with a test site of a test river. The limited sample of flow rate data may include a number of data points that is less than a threshold number of data points. The method also includes determining topographical characteristics of the test site. The method also includes determining a plurality of similar tested sites. A similar tested site can include a river site having topographical characteristics that are above a threshold level of similarity to the topographical characteristics of the test site and about which sufficient flow rate data has been collected for generating an accurate rating curve. Sufficient flow rate data may include a number of data points that is greater than or equal to the threshold number of data points. The method also includes generating a test site rating curve based on a combination of the limited sample of flow rate data and the sufficient flow rate data of one or more of the plurality of similar tested sites. The method also includes obtaining a stage reading associated with the test site from a sensor disposed at the test site. The method also includes determining a flow rate of the test site based on the stage reading and the test site rating curve.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
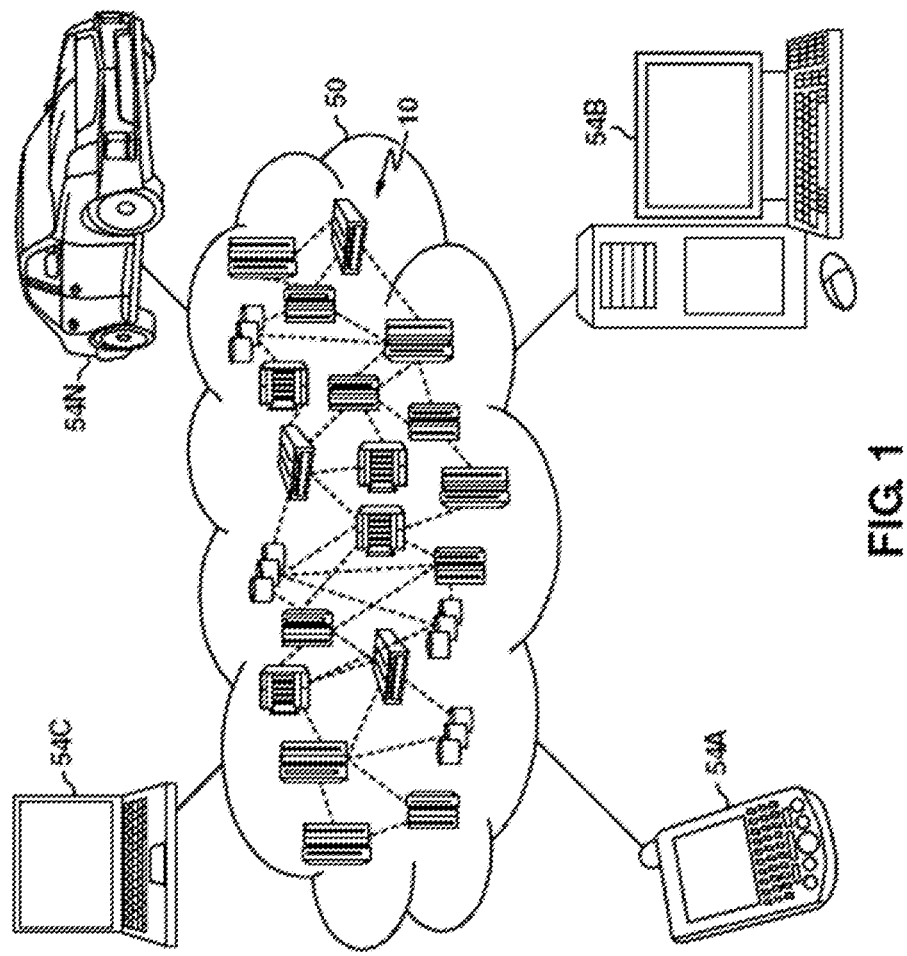
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments of the invention, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
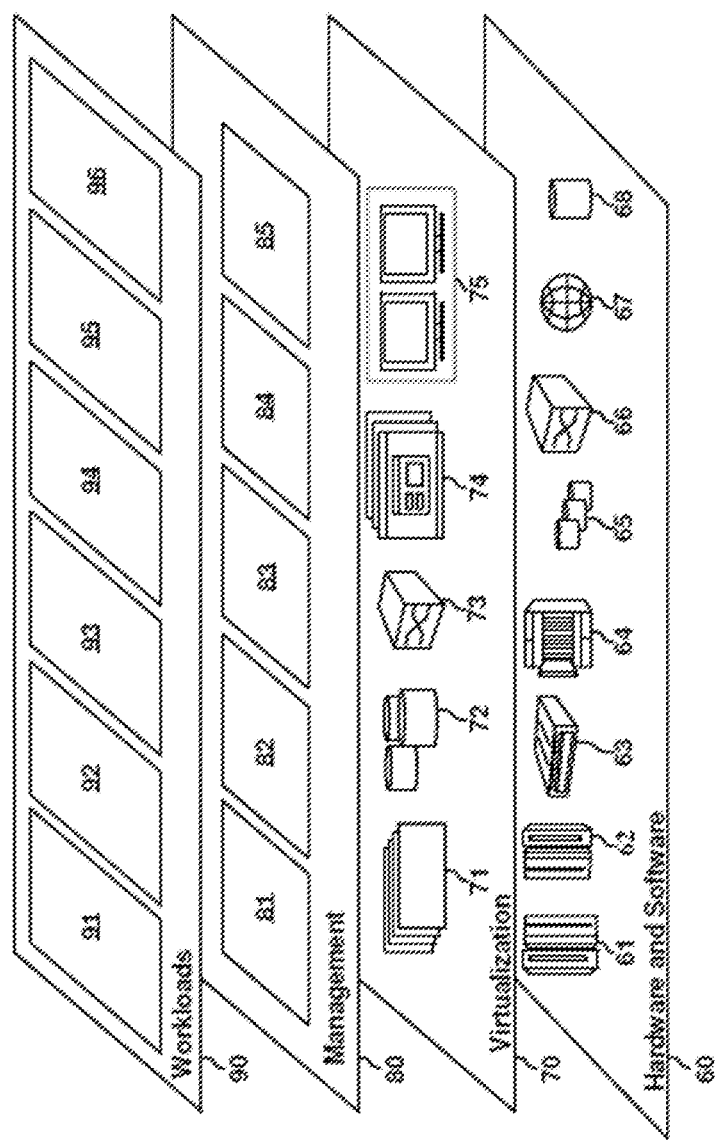
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments of the invention, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and determining an accurate river stream flow rate based on limited observations 96.

Figure 3:
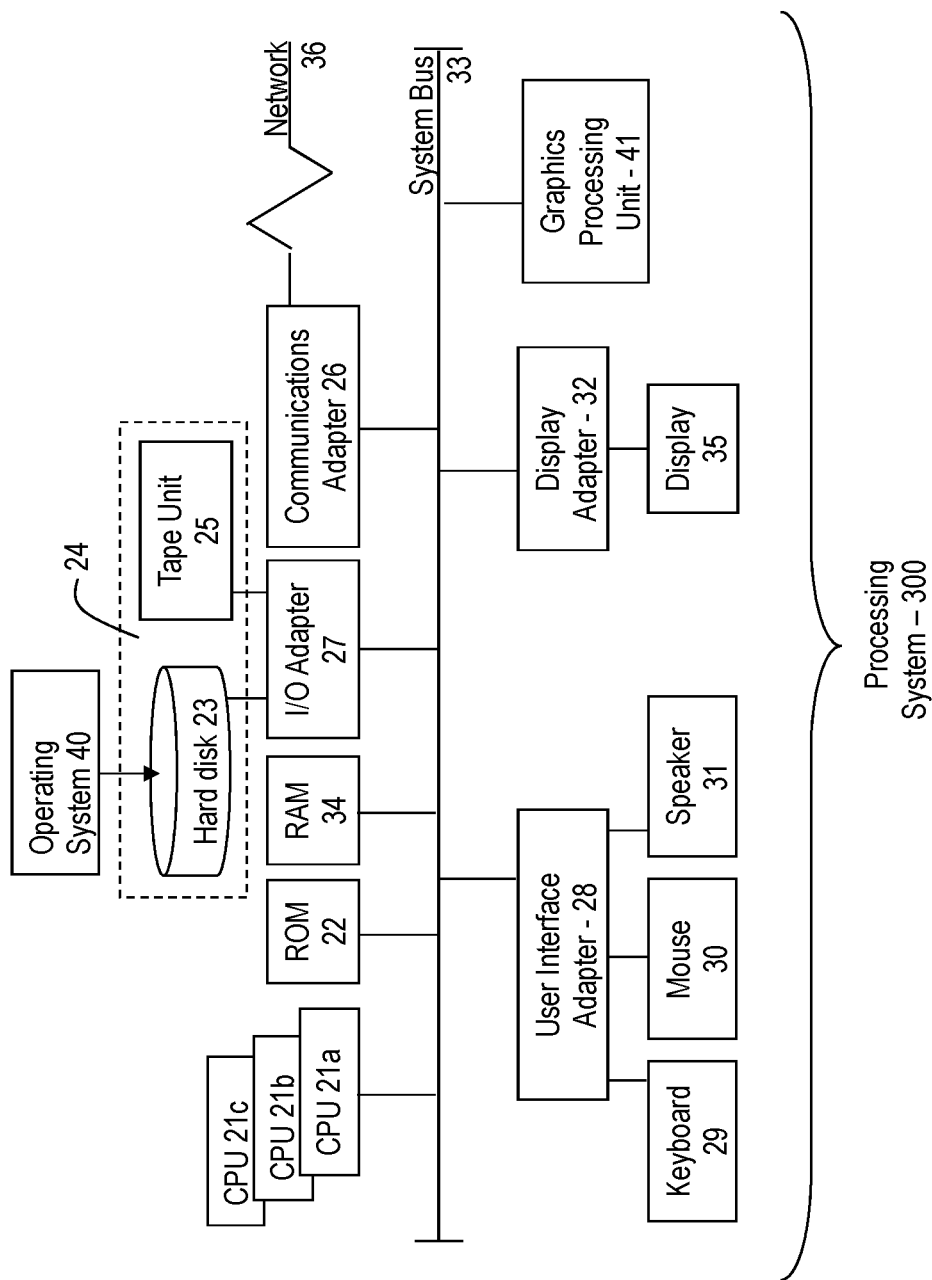
FIG. 3 depicts a block diagram of a computer system for use in implementing one or more embodiments of the present invention.

Referring to FIG. 3, there is shown an embodiment of a processing system 300 for implementing the teachings herein. In this embodiment of the invention, the system 300 has one or more central processing units (processors) 21a, 21b, 21c, etc. (collectively or generically referred to as processor(s) 21). In one or more embodiments of the invention, each processor 21 can include a reduced instruction set computer (RISC) microprocessor. Processors 21 are coupled to system memory 34 and various other components via a system bus 33. Read only memory (ROM) 22 is coupled to the system bus 33 and can include a basic input/output system (BIOS), which controls certain basic functions of system 300.

FIG. 3 further depicts an input/output (I/O) adapter 27 and a network adapter 26 coupled to the system bus 33. I/O adapter 27 can be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 can be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which can include a graphics adapter to improve the performance of graphics intensive applications and a video controller. In one embodiment of the invention, adapters 27, 26, and 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which can include, for example, a Super I/O chip integrating multiple device adapters into a single integrated circuit.

In exemplary embodiments of the invention, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment of the invention, a portion of system memory 34 and mass storage 24 collectively store an operating system coordinate the functions of the various components shown in FIG. 3.

In exemplary embodiments of the invention, a system for determining an accurate river stream flow rate based on limited observations is provided. As discussed above, river stream flow rates can be crucial to making predictions about flooding or other hydrological events that can impact communities or river-based sites such as bridges, dams, hydroelectric power facilities and the like. Conventionally, a rating curve can be used to estimate the river stream flow rate at a river site based on a measurement of the stage of the river. Such rating curves can be extrapolated from measurements at the river site. However, to generate an accurate rating curve, a large number of measurements taken under different conditions are generally needed, which typically requires engineers to physically visit the site and take measurements in visits in multiple seasons (e.g., a rainy season, a dry season, etc.). This process can take a very long time and the resultant river stream flow rate rating curve is only applicable to the specific site at which the measurements were obtained. Further, typical instruments used for measuring flow rate of a river can require 2-3 meters of depth to obtain readings, and thus measurement of very low depths (i.e., depths less than 3 meters) can be difficult or unavailable. If insufficient observations are used to create a rating curve, there is a high likelihood that the rating curve will be of low quality and will produce inaccurate flow rate estimations that can include negative flows and flow rate values with large uncertainties. Thus, traditionally, if an accurate river stream flow rate rating curve is desired for a new site on a river, a site on the river that has had topographical changes that will affect flow rates, or a new river entirely, it is generally necessary to repeat the lengthy and costly process of having engineers visit the site and obtain measurements for months, if not years. However, in exemplary embodiments of the invention, it is possible to provide accurate river stream flow rate predictions for a river site in which relatively few observations and measurements have been made, allowing for an accurate rating curve to be generated significantly faster and with less manual effort by engineers.

According to exemplary embodiments of the invention, the system is configured to allow for the generation of a rating curve for a test river site in which a small number of data points (i.e., observations of river stage and river flow) have been obtained by determining the topographical characteristics of the test river site, identifying river sites with similar topographical characteristics that have been previously tested (i.e., observations have been obtained at the site) and have a relatively large amount of data points, and generating a rating curve based on a combination of data points from the test river and the similar rivers. Thus, embodiments of the invention allow for the creation of an accurate rating curve for a river site in which a limited number of flow rate and stage observations have been made by constructing the rating curve based on a cohort of similar rivers/rivers sites. Once the rating curve for the test river site has been created, the river stream flow rate can be obtained by obtaining a stage reading from the test river site and determining a river stream flow rate of the rating curve that corresponds to the measured stage reading. According to some embodiments of the invention, such stage readings can be obtained remotely, by for example, accessing a stage sensing device (e.g., a radar measurement device) positioned at the test river site that can measure the stage of the river. As will be appreciated, once the river stream flow rate at a particular site on the river is known, it can be used to determine downstream effects, such as when flooding is expected to occur downstream, how fast a reservoir will fill up, when water will spill over a bank of the river and other such predictions. Thus, in response to determining that the river stream flow rate of the test site exceeds or fails to meet a predetermined threshold, the system can issue warnings (e.g., flood warnings) to areas that are projected to be affected or cause anticipatory actions to be taken at river-based sites such as dams, floodgates, hydroelectric power facilities and the like.

Figure 4:
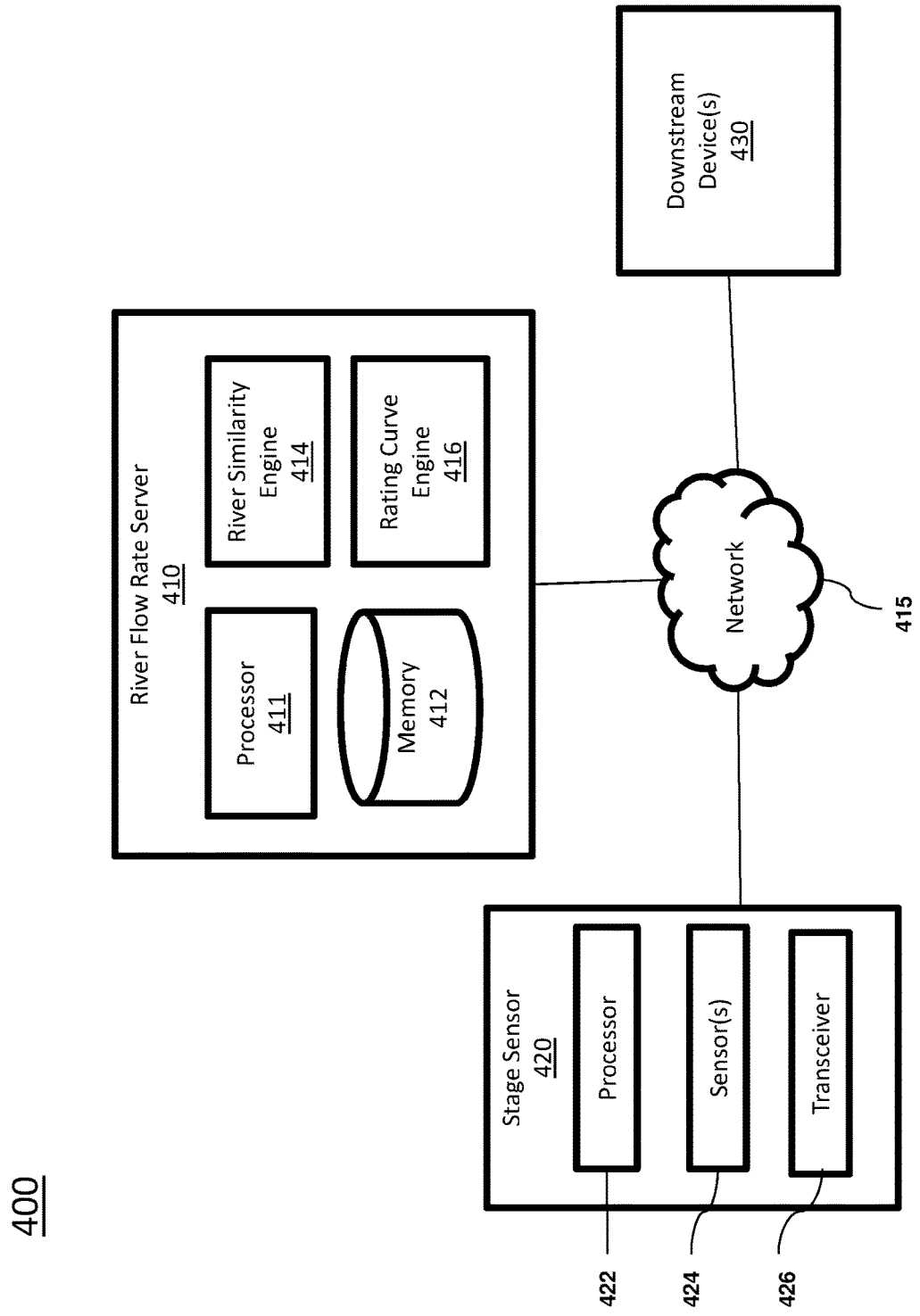
FIG. 4 depicts a system upon which determining an accurate river stream flow rate based on limited observations can be implemented according to one or more embodiments of the present invention.

Turning now to FIG. 4, a system 400 for determining an accurate river stream flow rate based on limited observations will now be described in accordance with an embodiment of the invention. The system 400 includes a river flow rate server 410 in communication with a stage sensor 420 and optionally, one or more downstream devices 430 via communications network 415. The communications network 415 can be one or more of, or a combination of, public (e.g., Internet), private (e.g., local area network, wide area network, virtual private network), and can include wireless and wireline transmission systems (e.g., satellite, cellular network, terrestrial networks, etc.). The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 411 for executing those instructions. Thus a system memory (e.g., memory 412) can store program instructions that when executed by the processing device 411 implement the engines described herein. Other engines can also be utilized to include other features and functionality described in other examples herein.

River flow rate server 410 can include memory that stores data relating to a plurality of river sites, such as observations and measurements about flow rates and stages at the river site and topographical characteristics of the river site, the associated river and/or an area surrounding the river site. A river site can refer to a limited area, portion or span of a portion of a river. For example, the terms "river site" as used herein refers to some or all of an area of a river that is disposed between a few feet along the bank of the river and the corresponding few feet on the opposing bank of the river. Measurements of flow rates and stages from one or more river sites can be user-input into river flow rate server 410 or can be received (e.g., via wireless communication via network 415) from one or more measurement devices, such as for example, stage sensor 420. River flow rates (i.e., the volume of fluid which passes per unit time) can be derived from a measured flow velocity combined with a known cross-sectional area of the river at the point of flow velocity (i.e., speed and direction of flow) measurement. Point "flowmeters" can measure the flow at one point in the river or an acoustic Doppler current profiler (ADCP) can measure the two-dimensional cross-sectional flow velocities of a river site. While it is possible to deploy flow velocity instruments at the same location as a stage sensor, it is generally not practical to do so as flow velocity instruments tend to be very expensive. Therefore it is desirable to have a system that can determine the flow rate of a river site based on data collected by a much less expensive stage sensor. Topographical characteristics can include for example but not limited to, a slope of a river bed, a cross-sectional width of the river at the river site and/or other sites of the river, a distance to a downstream lake or reservoir, types of vegetation that are present at the river site and/or along the river, geological features of the river site and/or other sites of the river, detailed cross sectional descriptions, and any other such characteristics of the river site, river or surrounding area that can be useful in characterizing the river flow properties of the river and/or river site. According to some embodiments of the invention, such topographical characteristics can be user-input into river flow rate server based on observations made by engineers in the field, obtained through light detection and ranging (LiDAR) measurements obtained from a LiDAR sensor (e.g., equipped on an aerial vehicle that flies over a region and takes LiDAR measurements).

In some embodiments of the invention, the river flow rate server 410 can include a river similarity engine 416 that is configured to determine a degree of similarity between one or more river sites, based on the topographical characteristics of the river sites stored by the river flow rate server 410. In some embodiments of the invention, the river flow rate server 410 can be configured to determine which river sites are within the same watershed (i.e., an area of land that drains all of the streams and rainfall into a common outlet), based on the geographic locations of the river sites. As will be appreciated by those of skill in the art, river sites that are within the same watershed will typically be affected by the same upstream factors. For example, if two rivers are in the same watershed and there is significant rainfall upstream from the rivers, it is expected that the rainfall will make its way into both rivers and increase the water level (i.e., stage) and/or flow rate of the downstream river sites of the rivers. According to some embodiments of the invention, the river similarity engine 416 can be configured to determine which other river sites are above a threshold level of similarity to a river site of interest. For example, in some embodiments of the invention, the river similarity engine 416 can compare each topographical characteristic of a pair of river sites to determine a degree of similarity of the characteristic and then determine an overall similarity score based on the various comparisons. For example, when comparing the width of river sites, the difference between two river site widths can be 10 feet (i.e., width of a first river site minus width of a second river site is 10 feet) and the river similarity engine 416 can assign a degree of similarity of the widths of the river sites based on a comparison of the difference in widths of the two river sites to the width of one of the river sites (e.g., a selected test river site). Thus, if a test river site has a width of 40 feet, the 10 foot difference in widths between the test river site and the second river site can be considered to be very large and thus the pair of river sites can have a low degree of similarity in relation to this characteristic, whereas if the test river site has a width of 200 feet, the 10 foot difference is much less significant and the two river sites can be considered to have a high degree of similarity with respect to this metric. According to some embodiments of the invention, a degree of similarity for each topographical characteristic can be determined using a different calculation or approach, based on the nature of the topographical characteristic. For example, with respect to vegetation, the degree of similarity of the river sites can be based on the number of matching plants found at each site or number of critical matching plants. Likewise, the degree of similarity of the river sites can be based on a degree of similarity between the slopes of the river beds at the respective river sites. In some embodiments of the invention, the overall similarity score can be a weighted average of the determined degrees of similarity of each characteristic. In some embodiments of the invention, river sites can be considered to be similar only if they are within the same watershed as one another. As will be understood by those of skill in the art, many different methodologies and/or algorithms can be used to determine an overall similarity score between two or more river sites. According to some embodiments of the invention, if the overall similarity score is above a predetermined threshold, the river sites can be classified as being similar to one another, whereas if the overall similarity score is below the predetermined threshold the river sites can be classified as being dissimilar to one another.

In some embodiments of the invention, the river flow rate server 410 includes a rating curve engine 416 that is configured to plot one or more river site data points on a chart and perform curve fitting operations on the data sets to generate a rating curve. Each river site data point can represented a measured flow rate of a river at a river site in relation to the measured river stage (i.e., height of the river). Such river data points can be obtained by measuring the flow rate and stage of a river site at various points of time. For example, a given set of river data points can be obtained over days, weeks, months or even years of observation-gathering by engineers. As described above, the flow rate of a river at a particular site can be measured using flow velocity measurement instruments operated by a field engineer. A rating curve generated by the rating curve engine 416 can represent the approximate or expected relationship between the stage of the river site and the flow rate of the river site, such that the rating curve can be used to extrapolate an approximate flow rate at the river site from a measured stage, without obtaining a physical measurement of the flow rate. Thus, such rating curves can allow the system to determine the approximate flow rate of a river site based on a measurement of the stage, allowing for the generation of real-time flow rate information that would otherwise be impractical to obtain through direct measurement. According to various embodiments of the invention, a rating curve can include linear, quadratic and/or exponential functions and coefficients of a fitting function. As will be understood by those of skill in the art, the rating curve engine 416 can apply curve fitting techniques to a plurality of data points (e.g., a set of data points associated with a river site) plotted on a graph to generate a rating curve. For example, in some embodiments of the invention, an operator of the system can specify a type of fitted curve to be used as the rating curve, such as whether it is a polynomial function (and if so, its degree) or an exponential. As will be appreciated by those of skill in the art, different types of curves may be selected by an operator based on what is most appropriate for the data set, as determined by the operator. According to some embodiments of the invention, the rating curve engine 416 can similarly be configured to generate a rating curve from a plurality of data sets, such as for example, data sets associated with similar river sites.

In embodiments of the invention, the stage sensor 420 includes a processor 422, one or more sensors 424 and a transceiver 426 for measuring the stage of a river. The terms "stage of a river" is used herein to refer to the relative height of the river as the water level rises and falls due to varying conditions (e.g., increases or decreases in rainfall). According to some embodiments of the invention, a sensor 424 can be a radar distance measurement device that can measure the distance from the surface of a river to the radar device, although any type of known distance measurement distance can be used (e.g., a fixed measurement device such as a pole or stake having pre-marked stage heights being observed by a camera paired with image recognition and/or visual distance measurement functionality that can obtain a stage height reading based on the position of the surface of the river relative to a height marking on the fixed measurement device). According to some embodiments of the invention, a stage sensor can be affixed to the underside of a bridge that passes over a river and can thus be advantageously positioned to measure the stage of the river at any point in time. In some embodiments of the invention, the stage sensor 420 can be configured to continually measure the stage of a river, to intermittently measure the stage of the river or to measure the stage of the river in response to a stimuli, such as a command received from river flow rate server 410. The transceiver 426 can allow the stage sensor 420 to wirelessly communicate stage readings to the river flow rate server 410. Thus, based on a stage reading obtained from a stage sensor 420 at a river site, the river flow rate server 410 can be configured to determine a corresponding flow rate of the river site based on a rating curve associated with the river site.

In exemplary embodiments of the invention, downstream device(s) 430 includes devices that can perform some functionality in response to a river site flow rate determined by river flow rate server 410. According to some embodiments of the invention, downstream devices 430 can include, for example but not limited to, one or more of a communication device that is configured to alert one or more individuals (e.g., via a siren, text messages, automated phone calls, emergency radio/television broadcasts, and/or the like) in an area that is downstream from the river site and is at risk of flooding based on the determined flow rate of the river at the river site, floodgates that can be opened or closed in response to an electronic signal from river flow rate server 410, a dam in the river that is downstream from the river site that has mechanically adjustable aspects in response to receiving an electronic signal from river flow rate server 410, floodgates that can be opened or closed in response to receiving an electronic signal from river flow rate server 410, a hydroelectric power facility that has gates leading to turbines that can be opened or closed based on an electronic signal from river flow rate server 410, and any other such type of device of facility on or near the river that is positioned downstream from the river site that can be affected by changes in the river flow. The flow rate data can also be stored for future reference and/or for use in calibration of a mathematical model of the river. Thus, in some embodiments of the invention, river flow rate server 410 can, in near real time, determine an estimate of the river flow of a river at a given river site and based on the determined river flow, can communicate with one of more downstream devices 430 to cause the downstream devices 430 to perform some function that can either take advantage of or protect against the impending water flow heading towards the downstream devices 430 or the surrounding areas. Thus, the system 400 can provide for automatic warnings of impending flooding and can automatically assist a river-based facility (e.g., a dam, a hydroelectric power facility, etc.) in optimizing its operation based on the impending downstream water flow from the river.

Figure 5:
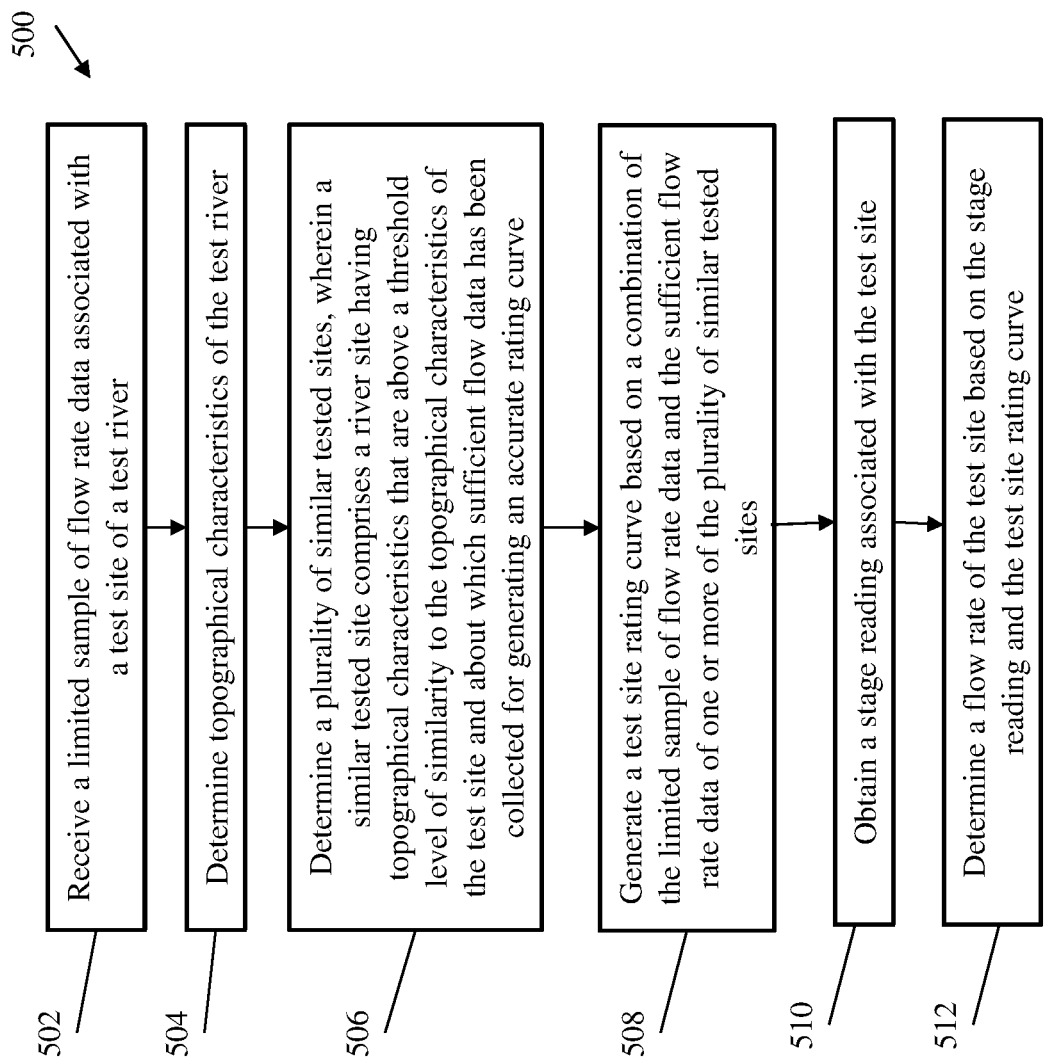
FIG. 5 depicts a flow diagram of a method for determining an accurate river stream flow rate based on limited observations according to one or more embodiments of the invention.

Turning now to FIG. 5, a flow diagram of a method 500 for determining an accurate river stream flow rate based on limited observations in accordance with an embodiment of the invention is shown. In one or more embodiments of the present invention, the method 500 can be embodied in software that is executed by computer elements located within a network that can reside in the cloud, such as the cloud computing environment 50 described herein above and illustrated in FIGS. 1 and 2. In other embodiments of the invention, the computer elements can reside on a computer system or processing system, such as the processing system 300 described herein above and illustrated in FIG. 3, a river flow rate server 410 described herein above and illustrated in FIG. 4, or in some other type of computing or processing environment. Although the methods disclosed herein are generally described with respect to determining an accurate flow rate of a river stream, it will be understood that it is contemplated that the disclosed methods may also be applied to streams, channels, ditches or any other such environments that facilitate streams.

Figure 6A:
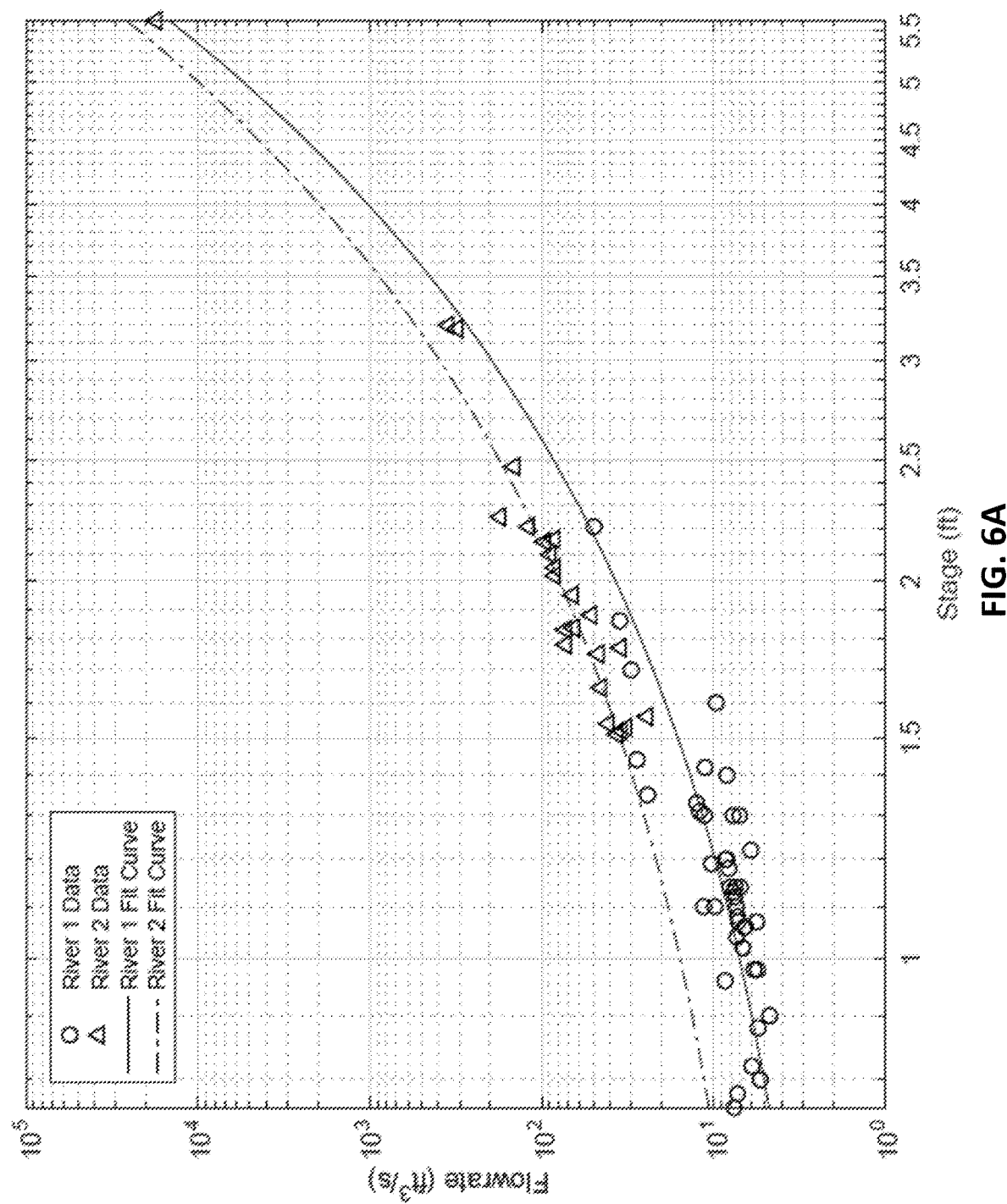
FIG. 6A depicts a river flow rate chart that includes river flow rate data points and rating curves based on two example data sets, according to one or more embodiments of the invention.

The method 500 begins at block 502 and includes receiving (e.g., via river flow rate server 410) a limited sample of flow rate data associated with a test site of a test river. Flow rate data can refer to a plurality of data points, where each data point of the plurality includes a measured flow rate plotted in relation to a measured river stage. For example, FIG. 6A shows an example chart where two sets of data points (i.e., "River 1 Data" and "River 2 Data") relating to two respective river sites are plotted on the chart. As shown, for each set of data points, a rating curve (i.e., "River 1 Fit Curve" and "River 2 Fit Curve") can be generated to represent the projected and/or expected relationship between the flowrate and the stage for each of the two river sites. For example, as described previously above, rating curve engine 416 of river flow rate server 410 can apply curve fitting techniques to each set of data to generate the respective rating curves. In this example, the two data sets are from two different river sites that are similar (e.g., as determined by river similarity engine 414), and thus the rating curves for each respective river site follow a similar pattern or trajectory.

Figure 6B:
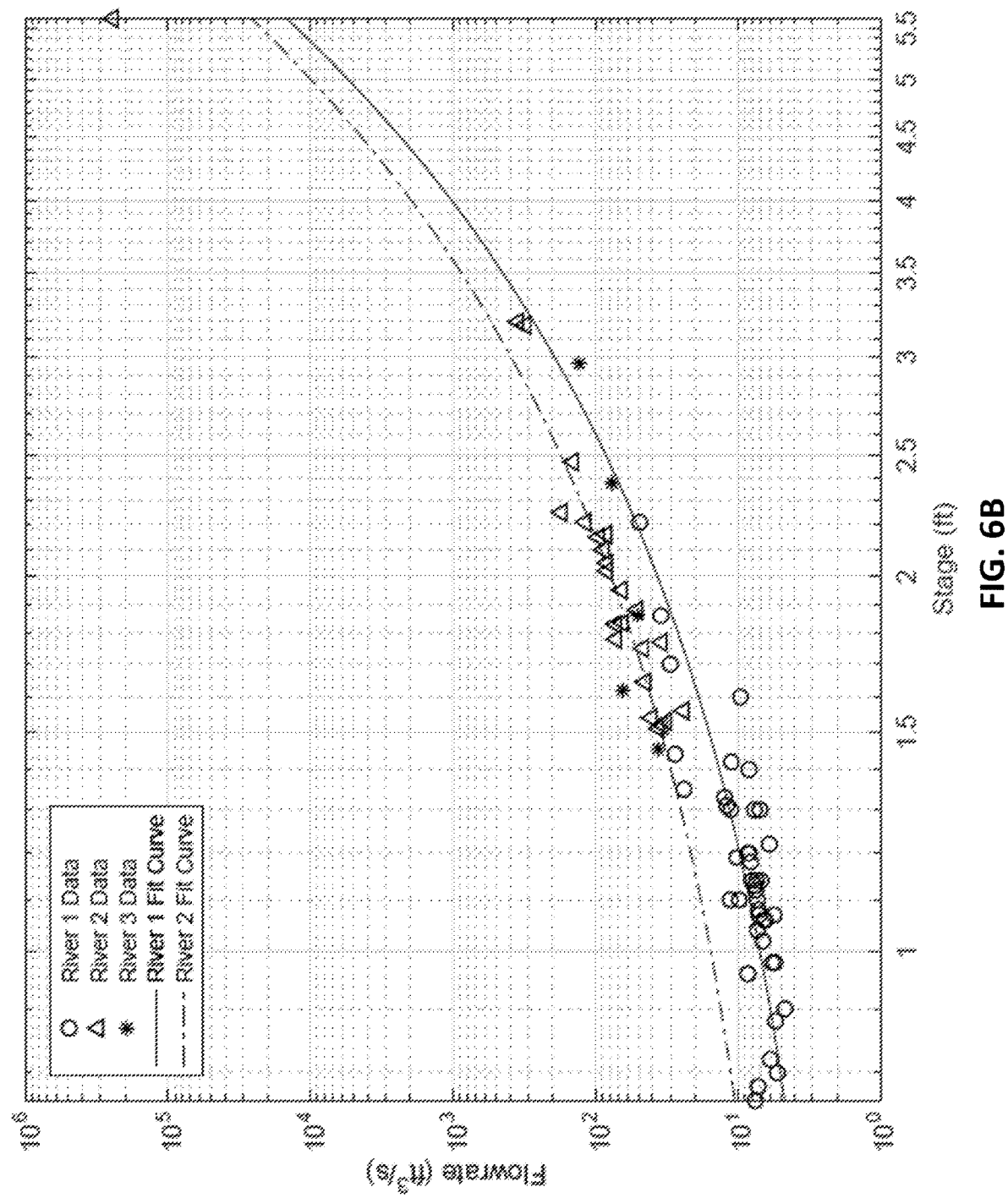
FIG. 6B depicts the river flow rate chart of FIG. 6A that includes additional river flow rate data points associated with a third example data set, according to one or more embodiments of the invention.
Figure 6C:
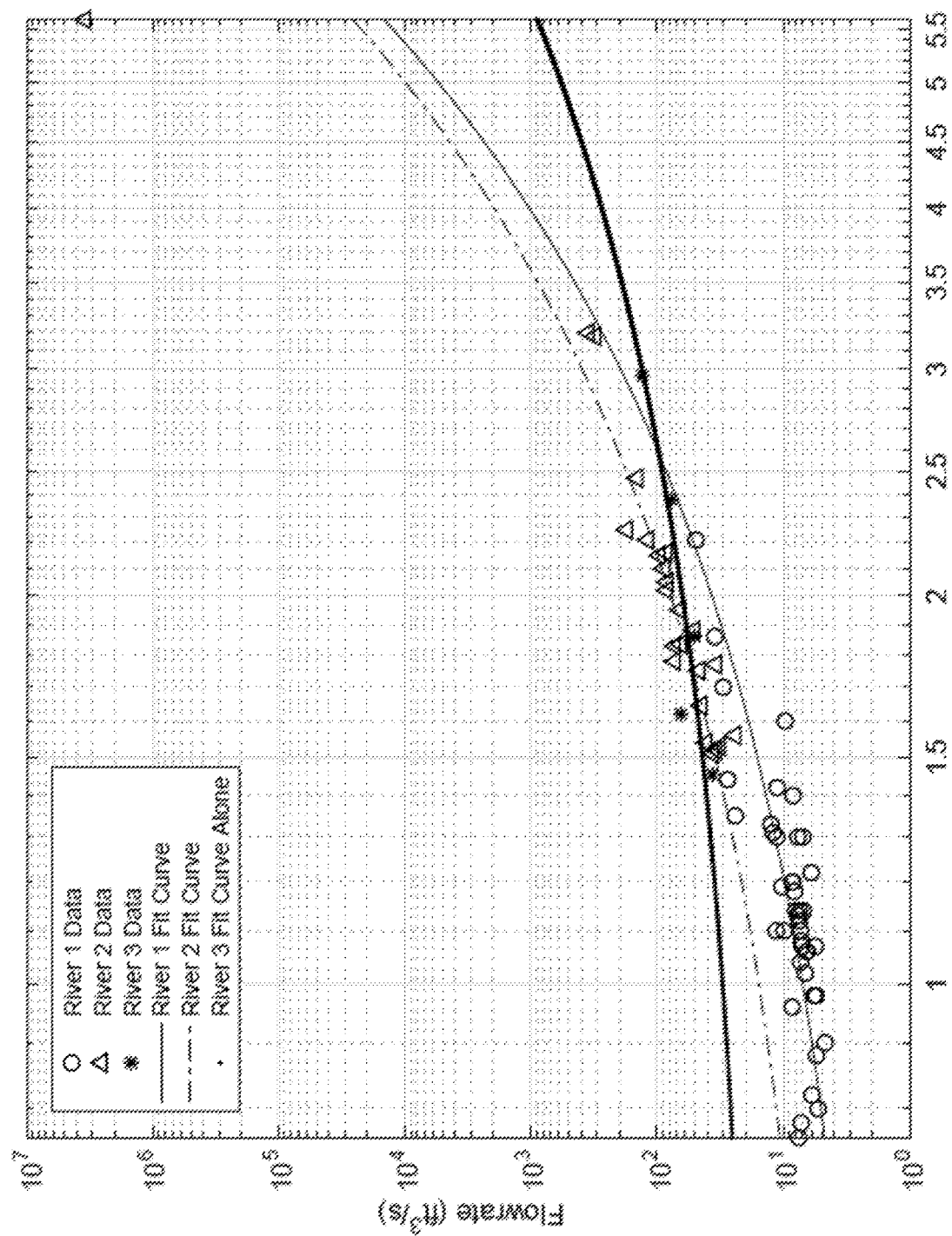
FIG. 6C depicts the river flow rate chart of FIG. 6B that includes an additional rating curve based on the third example data set, according to one or more embodiments of the invention.

According to some embodiments of the invention, a limited sample of flow rate data can be flow rate data that is insufficient for constructing an accurate rating curve. According to some embodiments of the invention, a limited sample of flow rate data can be a number of data points that is less than a predetermined threshold number of data points. According to some embodiments of the invention, an accurate rating curve can be considered to be a rating curve that is above a threshold level of accuracy or above an R-squared ($R^2$) value. As will be appreciated by those of skill in the art, an $R^2$ value is a statistical measure that represents the proportion of variance for a dependent variable that is explained by an independent variable or variables in a regression model. For example, if an $R^2$ value is "0.5", this represents that half of the observed variation can be explained by the model's inputs. An $R^2$ value can be determined by taking data points of dependent and independent variables, and finding the line of best fit (e.g., a rating curve) based on for example, a regression model, calculating predicted values (e.g., predicted flowrates based on the corresponding stage shown on the rating curve or predicted stages based on corresponding flow rates shown on the rating curve), subtracting the actual values (e.g., measured flow rates and/or measured stages) and squaring the results. Thus, in some embodiments of the invention, a limited sample of flow rate data can be a number of data points that when used to generate a rating curve, generates a rating curve having an $R^2$ value of less than a predetermined threshold. In some embodiments of the invention, the system may determine whether the sample of flow rate data is a limited sample that is insufficient for constructing an accurate rating curve by using an iterative process of building rate curves with varying numbers of data points and observing the degree of variation to the resulting rating curves. For example, a first curve may be generated based on a data set with N data points and then a second rating curve may be generated using N−1 data points and a degree of difference between the two curves may be measured, and the process may be repeated with N−2 data points and so on. If the difference between two rating curves exceeds a threshold, then at least one of the data sets corresponding to those rating curves (e.g., the one with less data points) may be considered to be a limited sample that is insufficient for constructing an accurate rating curve. Those of skill in the art will recognize that various metrics or combinations of metrics may be used to characterize "the difference" between two curves, such as for example, the average distance between points of the curve as measured across one axis of the graph (e.g., the difference in Y-axis values for each X-axis value), use of a sum of squared difference, use of absolute values at multiple grid points, or any other such methods as may be selected by one of skill in the art. FIG. 6B depicts an example of a third data set (i.e., "River 3 Data") that is much smaller than the first two data sets. As shown in FIG. 6C, if a rating curve were to be generated using the third data set alone, it would be vastly different than the other two rating curves derived from similar river sites. In this example, the third set of data is from a river site that is similar to the first two river sites (e.g., as determined via river similarity engine 414), and thus a rating curve for this river site would be expected to follow a similar path or trajectory as the first two rating curves, but because it is based on such a sparse amount of data, there is a large room for error and the resulting rating curve is very inaccurate. Thus, as shown by FIG. 6C, there is a need for a way of generating an accurate rating curve in cases where only sparse data is available for a given river site.

At block 504, the method includes determining (e.g., via river flow rate server 410) topographical characteristics of the test site. According to some embodiments of the invention, the topographical characteristics of a river site can include one or more of a slope of a river bed, a cross-sectional width of a river and a distance to a downstream lake or reservoir. In some embodiments of the invention, the topographical characteristics can be determined by river flow rate server 410 based on user-input measurements of topographical features of the test river site, measurements obtained from mapping resources (e.g., via third party mapping services hosted on the Internet), and/or readings from devices (e.g., LiDAR measurements) used to obtained measurements of the river site, or some combination of the preceding methods.

At block 506, the method includes determining (e.g., via river flow rate server 410) a plurality of similar tested sites. According to some embodiments of the invention, a similar tested site can be a river site having topographical characteristics that are above a threshold level of similarity to the topographical characteristics of the test site and about which sufficient flow rate data has been collected for generating an accurate rating curve. In some embodiments of the invention, flow rate data can be considered to be sufficient for generating an accurate rating curve if the number of data points in the flow rate data is equal to or above a predetermined threshold or if an $R^2$ value of a rating curve generated from the flow rate data exceeds a predetermined threshold. According to some embodiments of the invention, determining the plurality of similar tested sites can include determining that for each similar tested site of the plurality of similar tested sites, each topographical characteristic of the similar tested site is within a respective threshold range of a corresponding topographical characteristic associated with the test site. As described above, in some embodiments of the invention, river similarity engine 414 can determine a degree of similarity between two river sites based on a comparison of one or more topographical characteristics associated with the river sites. If the degree of similarity exceeds a predetermined threshold, then river similarity engine 414 can classify the two river sites as being similar. In this way, the river flow rate server 410 can identify one or more other river sites that are similar to the test river site, such that the relationships between the stage and the flowrate at the test river site and the identified similar river sites can be expected to be similar as well. Thus, the data points of the similar river sites can be combined with the limited sample of flow rate data associated with the test river to create a more complete data set for generating an accurate rating curve that is associated with the test river site.

Figure 6D:
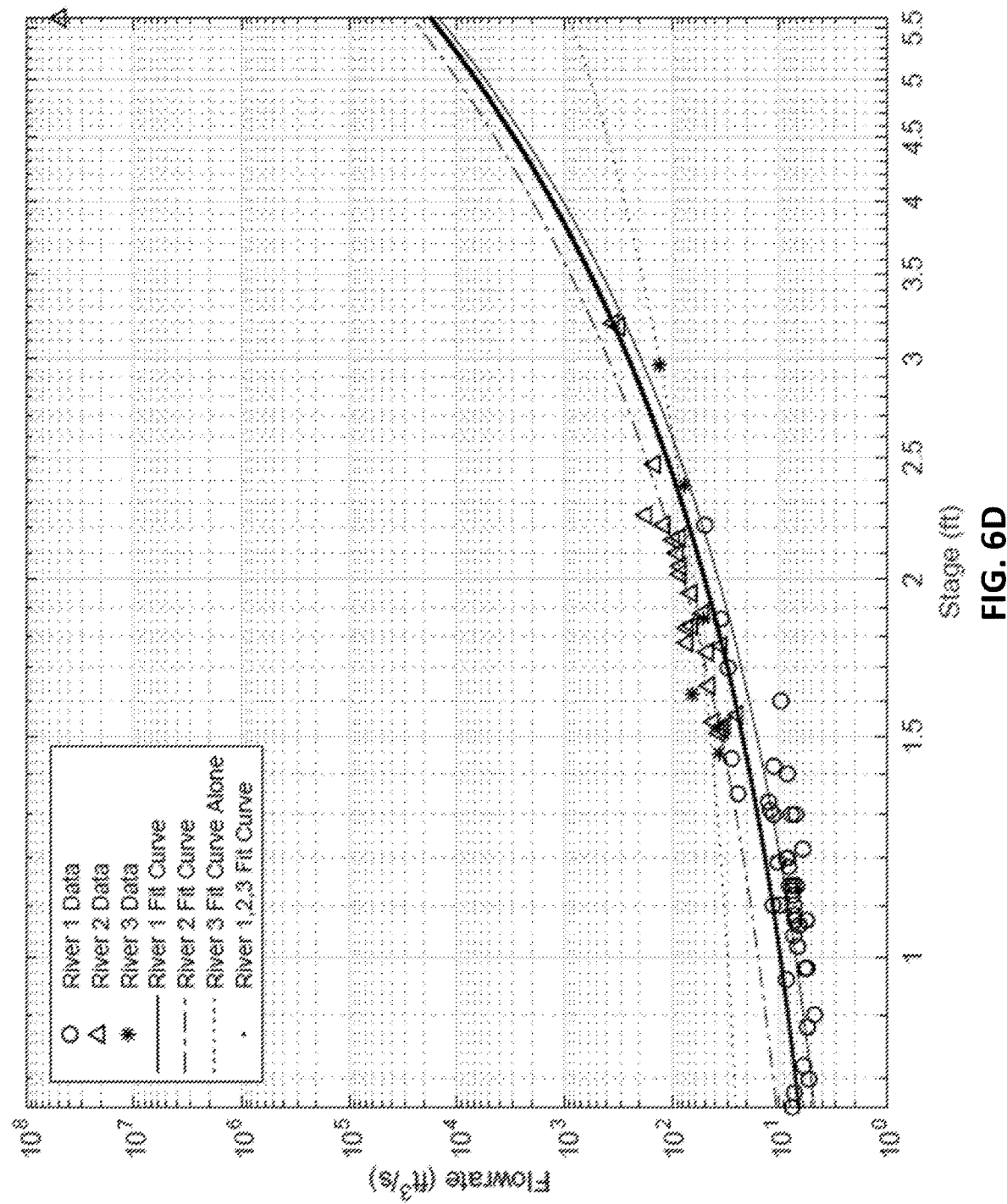
FIG. 6D depicts the river flow rate chart of FIG. 6B that includes an additional rating curve based on the three example data sets, according to one or more embodiments of the invention.

At block 508, the method includes generating (e.g., via river flow rate server 410) a test site rating curve based on a combination of the limited sample of flow rate data and the sufficient flow rate data of one or more of the plurality of similar tested sites. According to some embodiments of the invention, generating a test site rating curve can include applying a curve fitting algorithm to the combination of the limited sample of flow rate data and the sufficient flow rate data of one or more of the plurality of similar tested river sites. For example, as shown in FIG. 6D, the data sets of the first two river sites (i.e., "River 1 Data" and "River 2 Data") can be combined with the sparse data set of the third river site (i.e., "River 3 Data") and collectively used to generate a new rating curve (i.e., "River 1, 2, 3 Fit Curve") that can be used to more accurately approximate the stage-flowrate relationship of the third river site. As shown, this new rating curve more closely tracks the rating curves of the original two data sets, which is expected given that all river sites are similar in terms of their topographical profiles. According to various embodiments of the invention, a sparse data set (i.e., a limited sample of flow rate data) associated with a test site can be combined with one or more non-sparse data sets associated with one or more other similar (i.e., having similar topographical features) river sites to create a new non-sparse data set sufficient for use in creating an accurate rating curve in association with the test river site.

At block 510, the method includes obtaining (e.g., via river flow rate server 410) a stage reading associated with the test site from a sensor disposed at the test site. As discussed previously, the terms "stage reading" as used herein refers to the height of surface of a river relative to some reference height. According to some embodiments of the invention, the sensor disposed at the test river site can be a radar distance sensor disposed at a fixed position above the test river site. For example, a radar distance sensor can be positioned on the underside of a bridge such that it can transmit a radar pulse at an approximately perpendicular angle to the surface of the river.

At block 512, the method includes determining (e.g., via river flow rate server 410) a flow rate of the test site based on the stage reading and the test site rating curve. For example, rating curve engine 416 of river flow rate server 410 can identify a point on the rating curve associated with the test site that corresponds to the measured stage and then determine the flowrate that corresponds to that point on the rating curve.

Once obtained, the determined flow rate of the test site can be utilized to automatically execute a number of different functionalities (e.g., via downstream device(s) 430). For example, in some embodiments of the invention, the method can further include determining an amount to open a downstream floodgate based on the flow rate of the test site and automatically causing the downstream floodgate to open the determined amount. For example, the river flow rate server 410 can communicate with a downstream device 430 that controls the floodgate and cause the floodgate to open and/or close based on the determined flowrate at the test site. According to some embodiments of the invention, the method can further include obtaining continuous stage readings associated with the test site, determining continuous flow rates of the test site based on the continuous stage readings associated with the test site, and dynamically adjusting the size of an intake opening to the turbine in response to dynamically determining an amount to adjust a size of the intake opening to a turbine based on the flow rate of the test site to improve or optimize the operation of the turbine based on the river flow. In some embodiments of the invention, the method can include determining an estimated time of flooding at a downstream location based on the flow rate of the test site and automatically transmitting a flood warning to one or more devices associated with individuals proximate to the downstream location (e.g., based on location data of the one or more devices). Thus, in some embodiments of the invention, system 400 can be deployed as an early warning system in association with a river site in which very little previous data has been gathered, avoiding the need for expensive and protracted data gathering prior to providing the benefits of automatic floodgate/intake opening control and/or flood warnings.

Figure 7:
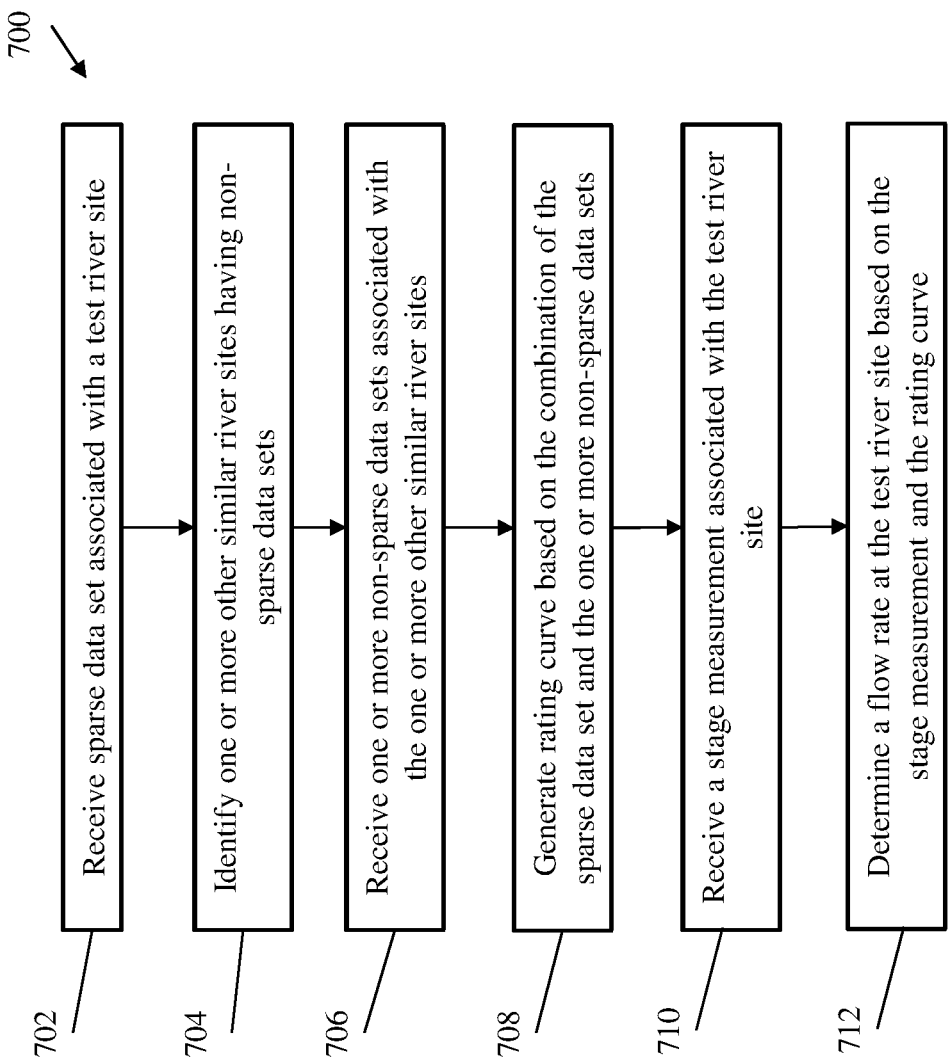
FIG. 7 depicts a flow diagram of another method for determining an accurate river stream flow rate based on limited observations according to one or more embodiments of the invention.

FIG. 7 depicts a flow diagram of a method 700 for determining an accurate river stream flow rate based on limited observations in accordance with an embodiment of the invention is shown. In one or more embodiments of the present invention, the method 700 can be embodied in software that is executed by computer elements located within a network that can reside in the cloud, such as the cloud computing environment 50 described herein above and illustrated in FIGS. 1 and 2. In other embodiments of the invention, the computer elements can reside on a computer system or processing system, such as the processing system 300 described herein above and illustrated in FIG. 3, a river flow rate server 410 described herein above and illustrated in FIG. 4, or in some other type of computing or processing environment.

The method 700 begins at block 702 and includes receiving (e.g., via river flow rate server 410) a sparse data set associated with a test river site. A data set can include a plurality of data points where each data point represents a measured stage and a corresponding measured flow rate of a river site. A sparse data set can be a data set is made up of a number of data points that is less than a predetermined threshold or that is insufficient to generate an accurate rating curve, as previously described above.

At block 704, the method 700 includes identifying (e.g., via river flow rate server 410) one or more other similar river sites having non-sparse data sets. For example, as described previously above, rating curve engine 416 can identify one or more river sites that are similar to the test river site, based on a comparison of the topographical information associated with each site.

At block 706, the method 700 includes receiving (e.g., via river flow rate server 410) one or more non-sparse data sets associated with the one or more other similar river sites. A non-sparse data set can be a data set having a number of data points that exceeds a predetermined threshold or that is sufficient for use in generating an accurate rating curve.

At block 708, the method 700 includes generating (e.g., via river flow rate server 410) a rating curve based on the combination of the sparse data set and the one or more non-sparse data sets. For example, river flow rate server 410 can apply curve fitting techniques to the collection of data points made up of the sparse data set and the one or more non-sparse data sets to generate a rating curve that best fits all of the data points. According to some embodiments of the invention, as more data points are generated through measurement (i.e., as data points are added to any data set), the rating curve can be recalculated based on the combination of data sets and the new additional data points. As will be understood, adding more data points for use in generating a rating curve will generally cause the resulting rating curve to be more accurate. Thus, according to some embodiments, a rating curve generated based on a sparse data set can be iteratively updated by rebuilding the curve each time a new data point is obtained at river site associated with the sparse data site. Likewise, the rating curve can also be iteratively updated if additional data points are obtained at river sites associated with the similar river sites having non-sparse data sets.

At block 710, the method 700 includes receiving (e.g., via river flow rate server 410) a stage measurement associated with the test river site. For example, as described previously, a stage sensor 420 disposed at the test river site can obtain a stage measurement from the river site and transmit the stage measurement to the river flow rate server 410.

At block 712, the method 700 includes determining (e.g., via river flow rate server 410) an approximate flowrate at the test river site based on the stage measurement and the rating curve. For example, the river flow rate server 410 can reference a point on the rating curve that correlates to the stage measurement and determine the flowrate that corresponds to that point on the rating curve. As described previously above, the determined flowrate can then be utilized by the river flow rate server 410 to generate alarms or cause one or more downstream device(s) 430 to take some action.

Additional processes can also be included. It should be understood that the processes depicted in FIGS. 5 and 7 represent illustrations, and that other processes can be added or existing processes can be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a processor, a first dataset comprising a limited sample of flow rate data associated with a test site of a test river, wherein the limited sample of flow rate data comprises a first number of data points that is less than a threshold number of data points, the threshold number of data points are required for constructing an accurate rating curve;
   determining, by the processor, topographical characteristics of the test site;
   determining, by the processor, a similar tested site, wherein the similar tested site comprises a river site having topographical characteristics that are above a threshold level of similarity to the topographical characteristics of the test site and about which a second dataset comprising flow rate data has been collected;
   generating, by the processor, a new dataset that includes the first dataset comprising the limited sample of flow rate data associated with the test site and the second dataset comprising the flow rate data of the similar tested site, wherein the new dataset comprises a second number of data points that is greater than or equal to said threshold number of data points for constructing the accurate rating curve;
   computing, by the processor, a test site rating curve based on the new dataset that comprises a combination of the limited sample of flow rate data from the test site and the flow rate data from the similar tested site;
   obtaining, from a sensor disposed at the test site, a stage reading associated with the test site; and
   determining, by the processor based on the stage reading and the test site rating curve, a flow rate of the test site.

2. The computer-implemented method of claim 1, wherein flow rate data comprises a plurality of data points, each data point comprising a measured flow rate plotted in relation to a measured river stage.

3. The computer-implemented method of claim 1, wherein the accurate rating curve comprises a rating curve having an R-squared value above a predetermined threshold.

4. The computer-implemented method of claim 1, wherein the topographical characteristics comprise one or more of a slope of a river bed, a cross-sectional width of a river and a distance to a downstream lake or reservoir.

5. The computer-implemented method of claim 1, wherein computing a test site rating curve comprises applying a curve fitting algorithm to the new dataset that comprises the sufficient flow rate data.

6. The computer-implemented method of claim 1, wherein the sensor disposed at the test site comprises a radar distance sensor disposed at a fixed position above the test site.

7. The computer-implemented method of claim 1, wherein the similar tested site comprises a plurality of similar tested sites, and determining the similar tested site comprises determining that each topographical characteristic of the similar tested site is within a respective threshold range of a corresponding topographical characteristic associated with the test site.

8. The computer-implemented method of claim 1 further comprising:
   determining, based on the flow rate of the test site, an amount to open a downstream floodgate; and
   automatically causing the downstream floodgate to open the determined amount.

9. The computer-implemented method of claim 1 further comprising:
   obtaining continuous stage readings associated with the test site;
   determining, based on the continuous stage readings associated with the test site, continuous flow rates of the test site; and
   responsive to dynamically determining an amount to adjust a size of an intake opening to a turbine based on the flow rate of the test site, dynamically adjusting the size of an intake opening to the turbine.

10. The computer-implemented method of claim 1 further comprising:
    determining, based on the flow rate of the test site, an estimated time of flooding at a downstream location; and
    automatically transmitting a flood warning to one or more devices associated with individuals proximate to the downstream location.

11. A system comprising:
    a processor communicatively coupled to a memory, the processor configured to:
    receive a first dataset comprising a limited sample of flow rate data associated with a test site of a test river, wherein the limited sample of flow rate data comprises a first number of data points that is less than a threshold number of data points, the threshold number of data points are required for constructing an accurate rating curve;

determine topographical characteristics of the test site;
determine a plurality of similar tested sites, wherein a similar tested site comprises a river site having topographical characteristics that are above a threshold level of similarity to the topographical characteristics of the test site and about which a second dataset comprising flow rate data has been collected;
generate a new dataset comprising the first dataset that includes the limited sample of flow rate data associated with the test site and one or more data points from the second datasets, respectively, corresponding to the similar tested sites, wherein the new dataset comprises a second number of data points that is greater than or equal to said threshold number of data points for constructing the accurate rating curve;
compute a test site rating curve based on the new dataset that comprises a combination of the limited sample of flow rate data from the test site and the flow rate data from the similar tested sites;
obtain, from a sensor disposed at the test site, a stage reading associated with the test site; and
determine, based on the stage reading and the test site rating curve, a flow rate of the test site.

12. The system of claim 11, wherein flow rate data comprises a plurality of data points, each data point comprising a measured flow rate plotted in relation to a measured river stage.

13. The system of claim 11, wherein the accurate rating curve comprises a rating curve having an R-squared value above a predetermined threshold.

14. The system of claim 11, wherein the topographical characteristics comprise one or more of a slope of a river bed, a cross-sectional width of a river and a distance to a downstream lake or reservoir.

15. The system of claim 11, wherein computing a test site rating curve comprises applying a curve fitting algorithm to the new dataset that comprises the sufficient flow rate data.

16. The system of claim 11, wherein the sensor disposed at the test site comprises a radar distance sensor disposed at a fixed position above the test site.

17. A computer program product comprising a computer readable storage medium having program instructions embodied therewith the program instructions executable by a computer processor to cause the computer processor to perform a method comprising:
receiving a first dataset comprising a limited sample of flow rate data associated with a test site of a test river, wherein the limited sample of flow rate data comprises a first number of data points that is less than a threshold number of data points, the threshold number of data points are required for constructing an accurate rating curve;
determining topographical characteristics of the test site;
determining a plurality of similar tested sites, wherein a similar tested site comprises a river site having topographical characteristics that are above a threshold level of similarity to the topographical characteristics of the test site and about which a second dataset comprising flow rate data has been collected;
generating a new dataset comprising the first dataset that includes the limited sample of flow rate data associated with the test site and one or more data points from the second datasets, respectively, corresponding to the similar tested sites, wherein the new dataset comprises a second number of data points that is greater than or equal to said threshold number of data points for constructing the accurate rating curve;
computing a test site rating curve based on the new dataset that comprises a combination of the limited sample of flow rate data from the test site and the flow rate data from the similar tested sites;
obtaining, from a sensor disposed at the test site, a stage reading associated with the test site; and
determining, based on the stage reading and the test site rating curve, a flow rate of the test site.

18. The computer program product of claim 17, wherein flow rate data comprises a plurality of data points, each data point comprising a measured flow rate plotted in relation to a measured river stage.

19. The computer program product of claim 17, wherein the accurate rating curve comprises a rating curve having an R-squared value above a predetermined threshold.

20. The computer program product of claim 17, wherein the topographical characteristics comprise one or more of a slope of a river bed, a cross-sectional width of a river and a distance to a downstream lake or reservoir.

* * * * *